July 16, 1957 D. V. TUTTLE 2,799,761
ELECTRIC HEATER ELEMENT
Filed June 14, 1954 4 Sheets-Sheet 1
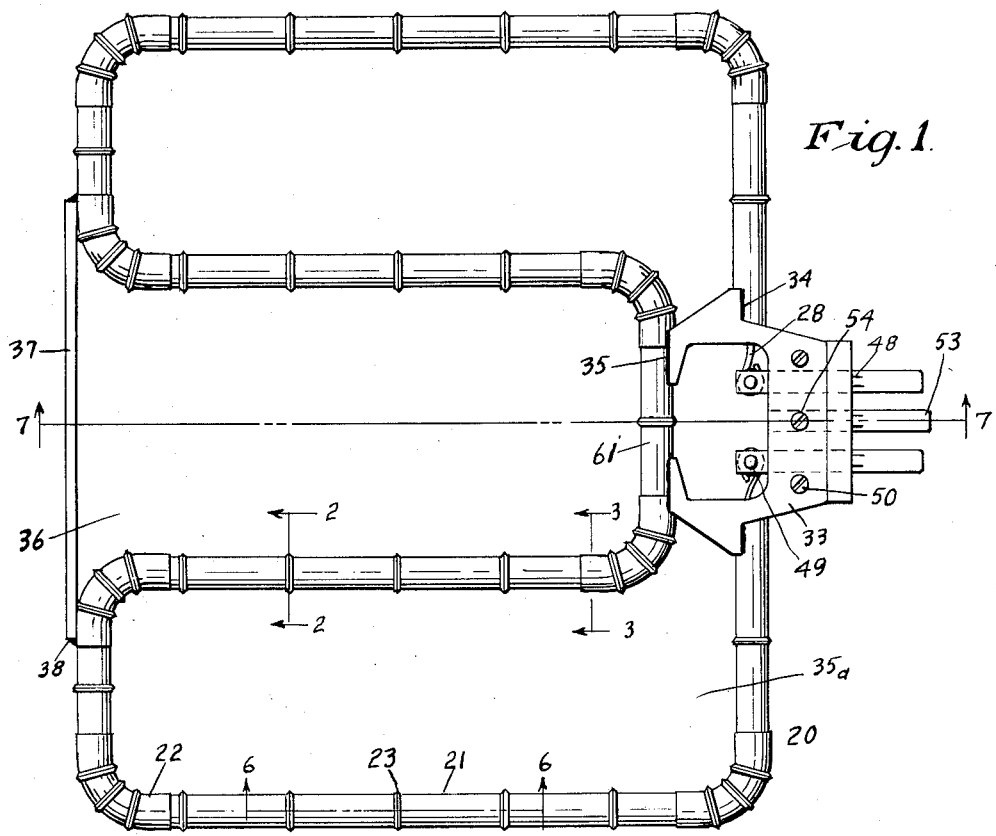
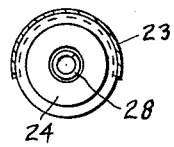
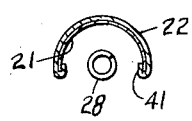
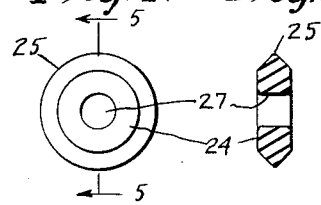
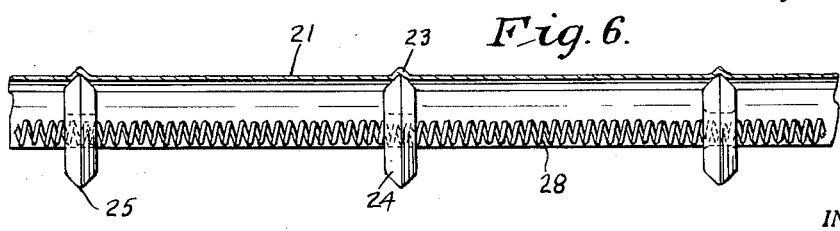
INVENTOR.
DANIEL V. TUTTLE
BY L.A.Paley
Att'y.

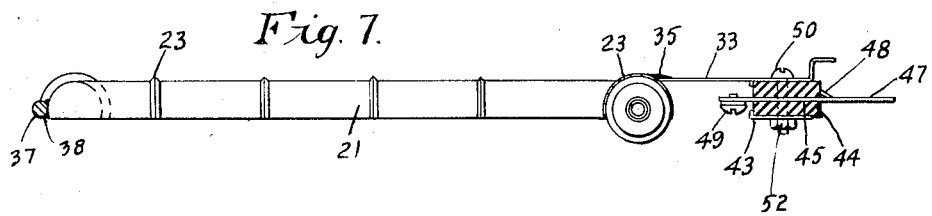
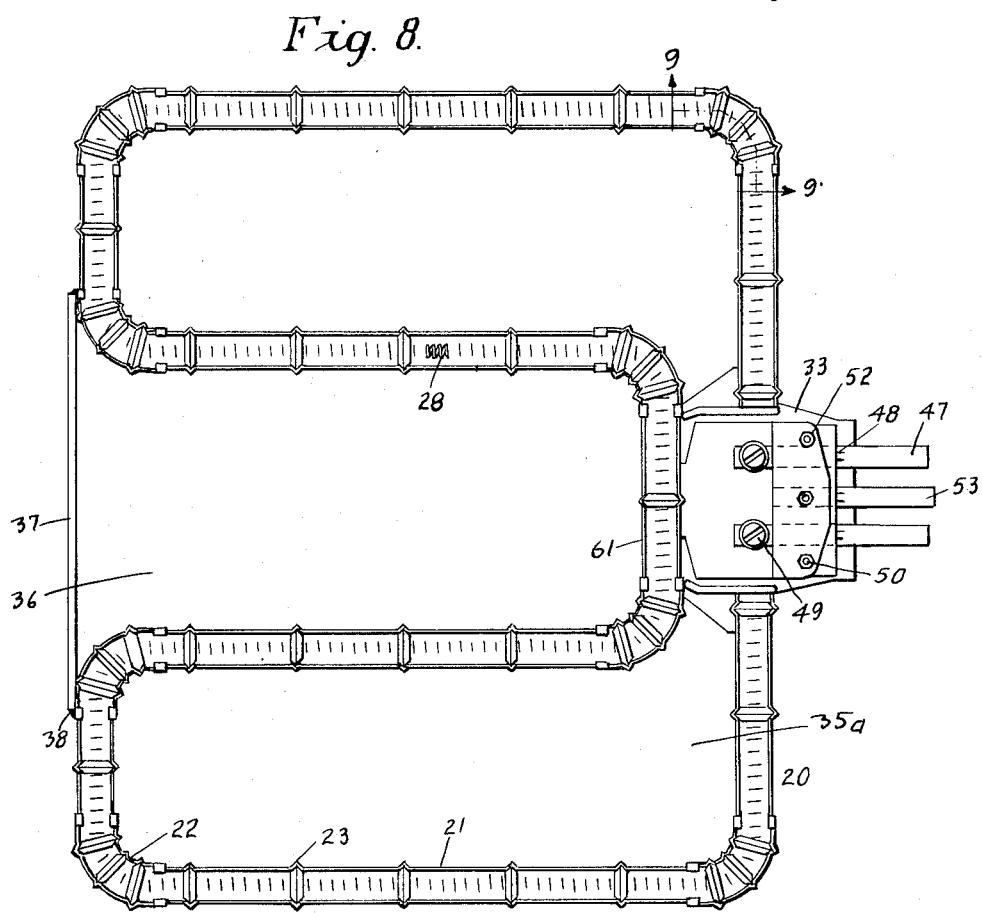
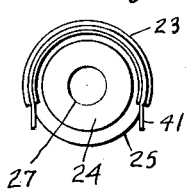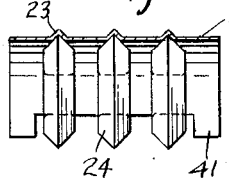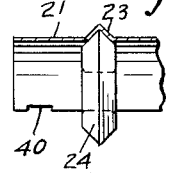
INVENTOR.
DANIEL V. TUTTLE
BY L. A. Paley
Atty.

July 16, 1957 D. V. TUTTLE 2,799,761
ELECTRIC HEATER ELEMENT
Filed June 14, 1954 4 Sheets-Sheet 3
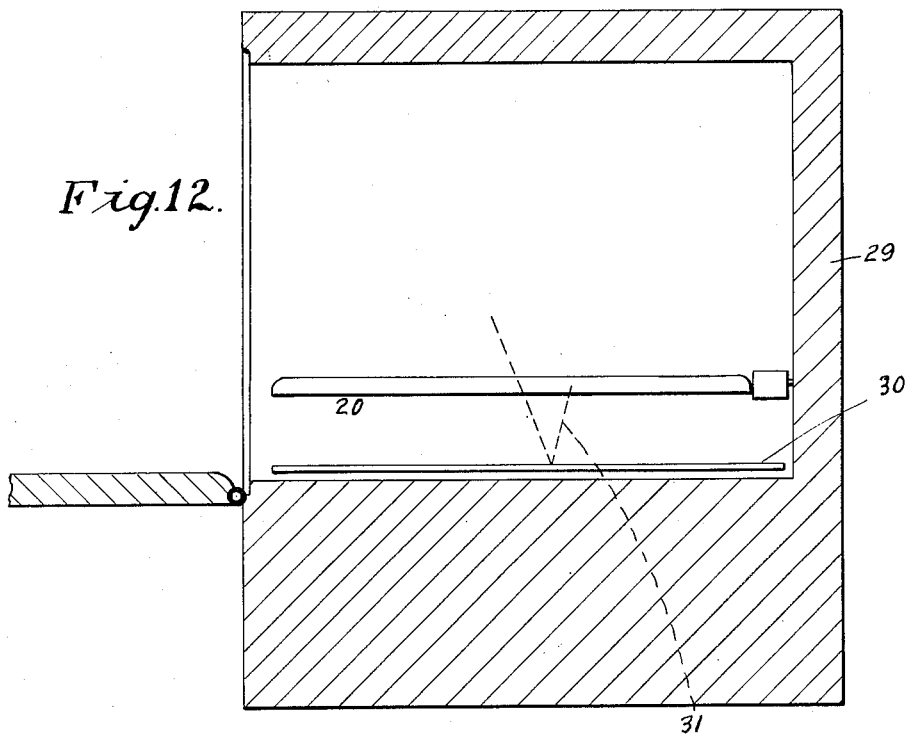
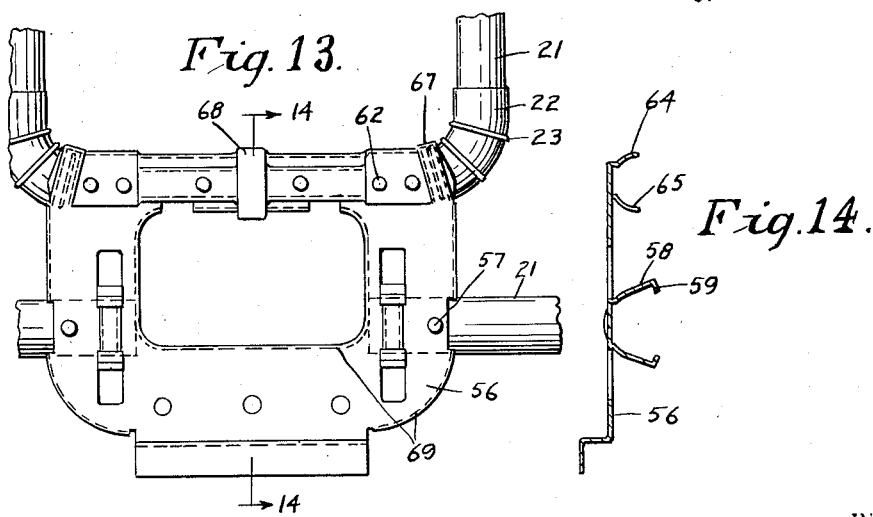
INVENTOR.
DANIEL V. TUTTLE
BY L. A. Paley
Atty.

July 16, 1957 D. V. TUTTLE 2,799,761
ELECTRIC HEATER ELEMENT
Filed June 14, 1954 4 Sheets-Sheet 4
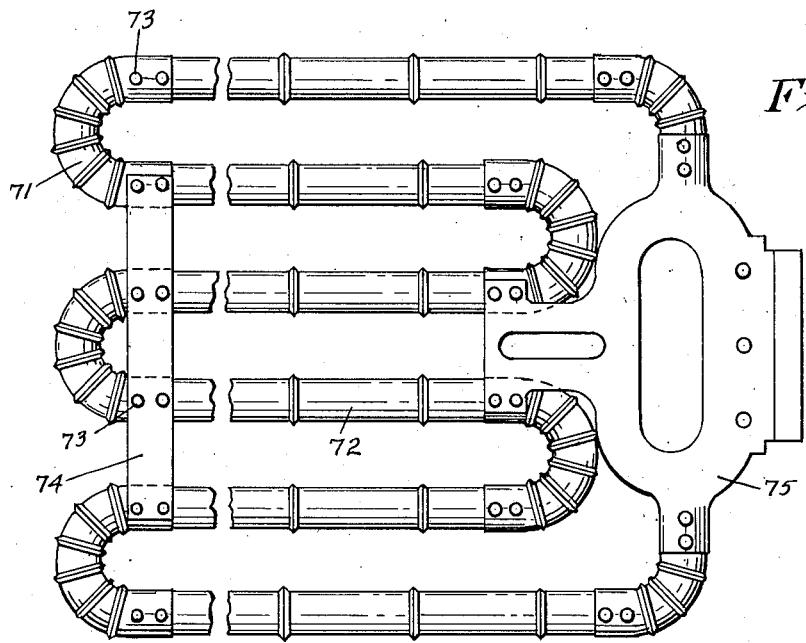
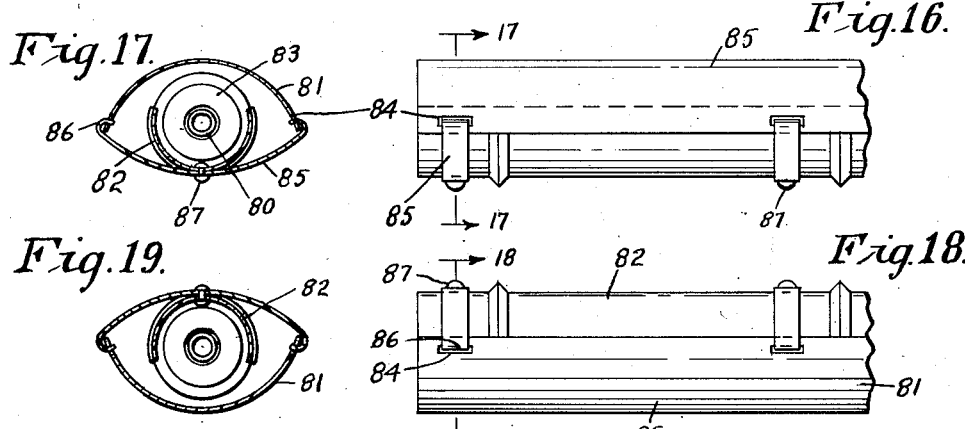
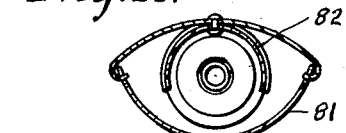
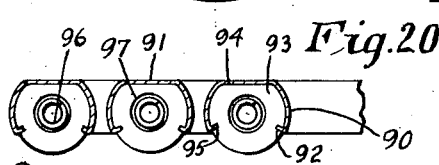
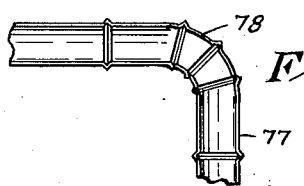
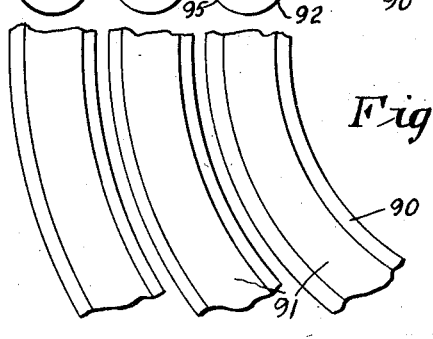
INVENTOR.
DANIEL V. TUTTLE

United States Patent Office 2,799,761
Patented July 16, 1957

2,799,761
ELECTRIC HEATER ELEMENT

Daniel V. Tuttle, Kirkland, Ill., assignor, by mesne assignments, to Tuttle Electric Products, Inc., Kirkland, Ill., a corporation of Illinois Application June 14, 1954, Serial No. 436,469

8 Claims. (Cl. 219—19)

This invention relates to electric heating devices and has reference more particularly to electric heater elements and certain electric oven improvements.

In the past, it has been conventional to use open coil heater elements in electric ovens, such as the ovens in domestic electric cooking ranges. However, due to the fact that the hot resistance wires are exposed to any drip resulting from baking or broiling being done near the top of the oven, burn out of the resistance wire is common with resulting high maintenance cost. Also the watts of electricity necessary to bake an item, such as a pie, is wasteful of electricity. The electric heating elements of the prior art also have a tendency to bake unevenly due to uneven distribution of heat, so as to cause one side of the baking item to burn while the other side is undone.

An object of this invention therefore, is to provide an electric heater element in which the resistance wire is protected by a shield to prevent drip from articles being baked near the top of the oven, from falling on the hot resistance wire and causing it to burn out.

Another object of the invention is to provide an electric heater element having a reflector over the resistance wire so as to make a more uniform distribution of heat in the oven and prevent burning of the item being baked or broiled.

Another object of the invention is to provide special purpose heater elements suitable for broilers, dryers, and hot plates.

A further object of the invention is to provide an electric oven in which a reflector plate is positioned below the electric heater element to aid in diffusing the heat more evenly.

A further object of the invention is to provide a shielded open coil heater element of improved efficiency so that a low wattage of electricity can be used to do the baking in the same or less time.

A still further object of the invention is to provide a shielded electric heater element suitable for use in clothes dryers, space heaters, incubators, brooders, broilers, coffee roasters, furnaces, fruit ripening rooms, hot plates, etc; also to improve electric heating devices in other respects hereinafter specified and claimed.

Reference is to be had to the accompanying drawings forming a part of this specification, in which:

Fig. 1 is a plan view of the heating element,

Fig. 2 is a sectional view through the heating element taken on line 2—2 of Fig. 1, Fig. 3 is a sectional view through the heating element taken on line 3—3 of Fig. 1, Fig. 4 is an elevation of one of the insulators, Fig. 5 is a sectional view through an insulator taken on line 5—5 of Fig. 4, Fig. 6 is a sectional view through the heating element taken on line 6—6 of Fig. 1, Fig. 7 is a sectional elevation through the heating element taken on line 7—7 of Fig. 1, Fig. 8 is a bottom view of the heating element, Fig. 9 is a sectional view through an elbow assembly taken on line 9—9 of Fig. 8, Fig. 10 is an end view of an elbow assembly before attachment to a straight section.

Fig. 11 is a sectional elevation through a straight section,

Fig. 12 is a sectional elevation through an oven with my improved heating element and reflector plate in position, Fig. 13 is a plan view of a modified preferred form of the terminal bracket, Fig. 14 is a sectional view through the terminal bracket taken on line 14—14 of Fig. 13, Fig. 15 is a plan view of a modified form of heating element, Fig. 16 is a fragmentary side elevation of a modified form of heater element with double reflector and suitable for use in broilers, Fig. 17 is a sectional elevation taken on line 17—17 of Fig. 16, Fig. 18 is a modified form of the device with double reflector, suitable for use in drying ovens, etc., Fig. 19 is a sectional elevation taken on line 19—19 of Fig. 18, Fig. 20 is a sectional elevation through a modified form of heater element suitable for use in hot plates, Fig. 21 is a fragmentary plan view of the device shown in Fig. 20, and Fig. 22 is a modified form of construction using integrally formed elbows and straight sections.

Referring to the drawings by numerals, a heating element 20 is composed of straight sections 21 and elbows 22, both of which are arcuate in cross section. The arc of the sections 21 and elbows 22 ranges from 190° to 230°, and arcuate beads 23 are formed at spaced intervals in said sections 21 and elbows 22 to receive ceramic insulators 24. The insulators 24 have an outer periphery 25 which is V-shaped in cross section to engage snugly in the beads 23. The insulators 24 are assembled in the sections 21 by slightly springing apart the walls of said sections. With the elbows 22, a plurality of insulators 24, such as three in number, is used. The side walls are preferably left straight until the insulators 24 are assembled, after which the side walls of the elbow are crimped inwardly by a suitable die to clamp the insulators 24 in position. Each insulator 24 has a central hole or perforation 27 slightly larger in diameter than a coil resistance wire 28 which passes through several insulators 24.

The straight sections 21 and elbows 22 form a reflector shielding element over the resistance wire 28 so that when the heating element 20 is placed in an oven 29, the resistance wire 28 is shielded to prevent any drip from the articles being baked in the upper part of the oven from falling on the resistance wire to cause it to burn out. The reflector unit formed by sections 21 and elbows 22 also produces a turbulence in the heat rays and serve to diffuse the heat over the entire oven so that the pie, cake, or item being baked is uniformly baked and does not become burnt on one side and underdone on the other side. This diffusing effect can be increased by placing a polished reflector plate 30 in the bottom of the oven 29 so that heat rays 31 emanating from the resistance wire 28 are reflected downwardly to strike the plate 30 and then are reflected upwardly at various angles to produce an absolute uniform heat in the oven. The sections 21 and elbows 22 are preferably made of stainless steel or other suitable metal whose surface remains bright and does not rust as a result of the heat from the resistance wire 28.

A terminal bracket 33 is secured as by welding 34 and 35 to the sections 21 and elbows 22. The heating element 20 may be in the form of two sinuous loops 35a separated by the space 36, and a tie rod 37 is connected at its end by welds 38 to the elbows 22 so as to stabilize the structure of the heating element 20. Near the end of the straight section 21 is formed along the bottom end, the notch 40 for receiving bendable ears 41 formed in pairs at the bottom of each elbow 22. The elbows 22 are slightly larger in diameter than the straight sections 21 so that the sections 21 telescope into the elbows 22.

The terminal bracket 33 is provided with a struck-out flange 43 which is a bent back parallel to bracket 33 so as to embrace the side faces of the ceramic insulator 44 in the form of a rectangular block.

Openings 45 such as 3 in number for 220 volts operation, pass through the insulator block 44 to receive terminal strips 47 of suitable metal. A lug 48 is struck-out from terminal strip 47 in order to limit the longitudinal movement of terminal 47. A screw 49 is tapped into the end of the terminal 47 opposite the lug 48 and both ends of the resistance wire 28 are attached by the screws 49 to the two terminals 47. Screws 50 pass through the bracket 33 and flange 43, being secured by nuts 52 to tightly grip insulator block 44. A neutral terminal 53 also passes through the center insulator block 44 and has a tapped hole to receive a screw 54 which connects the strip 53 with the bracket 33 which is ground.

In the preferred form of the terminal bracket 56 shown in Figs. 13 and 14, I use rivets 57 to attach the ends of straight sections 21 to the bracket 56, and bendable flanges 58 with terminal flanges 59 are arranged to be clinched about the lower edges of the straight section 21. A straight section 61 is attached to bracket 56 by rivets 62. Arcuate flanges 64 and 65 are formed from the bracket 56 to receive the arcuate elbow 22 and cooperate with the rivets 62 in holding the structure in rigid assembly. Clearance pads 67 and 68 are pressed from the bracket 56 in order to receive the beads 23. The bracket 56 is a die formed item and has suitable reinforcing flanges 69 to stiffen the bracket and aid in providing a rigid structure for the heating element 20.

In the modified form of the device shown in Fig. 15, 180° elbows 71 are used to get sharp bends so that two additional straight sections 72 are possible without increasing the overall area of the heater element. The elbows 71 are attached to the straight sections 72 by rivets 73, said rivets also serving to connect a tie bar 74 between the sections to make a rigid assembly. A special shaped stamped bracket 75 is also attached to the sections by rivets 73.

As shown in Fig. 22, modified straight sections 77 may be integrally formed with elbows 78 by stamping with a punch press and by a rolling operation. This construction may be used if desired with the forms of the device shown in Figs. 1, 8 and 15.

The modified form of device shown in Figs. 16 and 17 is suitable for use in broilers where rising steam and smoke has a tendency to contaminate the resistance wire 80. In this form, the heater element is positioned upside-down as shown in Fig. 8, and an elongated, arcuate, reflector 81 is positioned above reflector sections 82 which support the insulators. At intervals, the reflector 81 has pairs of openings 84, and arcuate straps 85 which have hooks 86 at the ends to detachably engage in the openings 84. The middle portion of each strap 85 is attached by a rivet 87 to the reflector section 82 so as to support the reflector 81 on reflector section 82. The modified form of device shown in Figs. 18 and 19 is identical to that shown in Figs. 16 and 17 except that the entire structure is upside-down. This form of device is suitable for use in drying ovens, such as baked enamel ovens, to be used instead of infrared lamps. The turbulence of the heat rays as a result of double reflection, is especially advantageous for drying baked enamel, and other uses, because of the uniform heat produced.

In the form of the device shown in Figs. 20 and 21, a construction suitable for use in hot plates is intended to take the place of the more expensive calrod type of heater element. An arcuate shell 90 is provided with a flat top 91 and inturned flanges 92 formed along the lower edges of said shell 90. Special insulators 93 have flat tops 94 and opposed notches 95 which engage the flanges 92 to support said insulators in said shell 90. The shell 90 is formed into spiral form as shown in Fig. 21 so that the heater element may be used as a upper burner for an electric range or other cooking or heating device. This form of device will have coiled resistance wire 96 which passes through a hole 97 in insulator 93 to be supported thereby.

The heating elements described are suitable for a large number of applications other than being used in the oven 29. These applications in part are as follows: clothes dryers, space heaters, incubators, brooders, coffee roasters, furnaces, fruit ripening rooms, hot plates, broilers, baked enamel ovens, range burners, etc.

I would state in conclusion, while the examples illustrated constitute practical embodiments of my invention, I do not wish to limit myself precisely to these details since manifestly the same may be considerably varied without departing from the spirit of the invention as defined in the appended claims.

Having thus described my invention, I claim as new and desire to secure by Letters Patent:

1. In a heating element, an arcuate metallic reflector and shielding unit in sectional form, said unit comprising straight sections and elbows telescoping with said straight sections, interconnecting bendable ears and notches associated with said elbows and straight sections for connecting together said straight sections and elbows, insulators held in place in said straight sections and elbows, and a resistance wire supported by said insulators in drip-free position below said shielding unit.

2. In a heating element, an arcuate metallic reflector and shielding unit in sectional form and comprising straight sections and elbows forming a sinuous path, insulators supported by said shielding unit, a resistance wire passing through said insulators, a metallic terminal bracket having bendable struck-out flanges for engagement with the ends of said shielding unit, a second portion of said bracket being arranged to receive a straight section of said shielding unit and to be rivet attached to said shielding element, a terminal block secured to said bracket, and terminals supported by said block and connected to said resistance wire.

3. In a heating element, an elongated arcuate metallic reflector and shielding unit in sectional form, said unit comprising straight sections and elbows telescoping with said straight sections, interconnecting bendable ears and notches associated with said elbows and straight sections for connecting together said straight sections and elbows, insulators held in place in said straight sections and elbows, a resistance wire supported by said insulators in drip-free position below said shielding unit, a metallic terminal bracket having bendable struck-out flanges for engagement with the ends of said shielding unit, a second portion of said bracket being arranged to receive a straight section of said shielding unit and to be rivet attached to said shielding unit, a terminal block secured to said bracket, and terminals supported by said block and connected to said resistance wire.

4. In a heating device, an arcuate metallic reflector and shielding unit in sectional sinuous form, said unit comprising straight sections and elbows grouped to form a pair of rectangular loops, insulators held in concentric position by said shielding unit, a resistance wire passing through said insulators in drip-free position below said shielding unit, a tie bar connecting said loops so as to hold said loops in spaced, rigid position, a terminal bracket connecting adjacent portions of said shielding unit, and interconnecting bendable ears and rivets connecting said terminal bracket to said shielding unit.

5. A reflector heater of flat open grill type providing substantially unobstructed circulation therethrough from one side to the other side thereof and from one side of which heat rays are distributively reflected, said heater comprising an elongated trough-shaped reflector which constitutes the main frame of the heater and is shaped in the direction of its width into an open winding with spaced apart convolutions separated by open spaces through which substantially unobstructed circulation is provided as aforesaid, the said trough-shaped reflector having therein an elongated helix of resistance wire which is substantially entirely exposed and extends lengthwise of the trough-shaped reflector and is energizable to provide a source of heat within the reflector, and insulators which are individually mounted in the trough-shaped reflector at spaced apart intervals lengthwise therein and have the helix extending therethrough and supported thereby, the trough-shaped reflector having opposite ends thereof at the periphery of the heater projecting toward one another, the heater being provided at said opposite ends with a mounting bracket to which said opposite ends are fastened and by which they are held in fixed relation to one another, the aforesaid convolutions of the winding forming laterally spaced loops with return bends at the ends of the loops and at least one of the return bends is near to the location of the said opposite ends of the trough-shaped reflector and fastened to the bracket.

6. A reflector heater of flat open grill type providing substantially unobstructed circulation therethrough from one side to the other side thereof and from one side of which heat rays are distributively reflected, said heater comprising an elongated trough-shaped reflector which constitutes the main frame of the heater and is shaped in the direction of its width into an open winding with spaced apart convolutions separated by open spaces through which substantially unobstructed circulation is provided as aforesaid, the said trough-shaped reflector having therein an elongated helix of resistance wire which is substantially entirely exposed and extends lengthwise of the trough-shaped reflector and is energizable to provide a source of heat within the reflector, and insulators which are individually mounted in the trough-shaped reflector at spaced apart intervals lengthwise therein and have the helix extending therethrough and supported thereby, the trough-shaped reflector having opposite ends thereof at the periphery of the heater projecting toward one another, the heater being provided at said opposite ends with a mounting bracket to which said opposite ends are fastened and by which they are held in fixed relation to one another, the aforesaid convolutions of the winding forming laterally spaced loops with return bends at the loop ends and at least one of the return bends is near to and fastened to the bracket and several of the return bends are remote from the bracket and held in spaced apart relation by a brace.

7. A reflector heater of flat open grill type providing substantially unobstructed circulation therethrough from one side to the other side thereof and from one side of which heat rays are distributively reflected, said heater comprising an elongated trough-shaped reflector which constitutes the main frame of the heater and is shaped in the direction of its width into an open winding with spaced apart convolutions separated by open spaces through which substantially unobstructed circulation is provided as aforesaid, the said trough-shaped reflector having therein an elongated helix of resistance wire which is substantially entirely exposed and extends lengthwise of the trough-shaped reflector and is energizable to provide a source of heat within the reflector, and insulators which are individually mounted in the trough-shaped reflector at spaced apart intervals lengthwise therein and have the helix extending therethrough and supported thereby, the trough-shaped reflector having opposite ends thereof at the periphery of the heater projecting toward one another, the heater being provided at said opposite ends with a mounting bracket to which said opposite ends are fastened and by which they are held in fixed relation to one another, the aforesaid convolutions of the winding forming a yoke with laterally spaced substantially parallel legs with return bends at their outer ends leading to at least one reentrant loop portion which is interposed between the legs and extends toward said bracket and terminates in a return bend which is secured to said bracket.

8. A reflector heater of flat open grill type providing substantially unobstructed circulation therethrough from one side to the other side thereof and from one side of which heat rays are distributively reflected, said heater comprising an elongated trough-shaped reflector which constitutes the main frame of the heater and is shaped in the direction of its width into an open winding with spaced apart convolutions separated by open spaces through which substantially unobstructed circulation is provided as aforesaid, the said trough-shaped reflector having therein an elongated helix of resistance wire which is substantially entirely exposed and extends lengthwise of the trough shaped reflector and is energizable to provide a source of heat within the reflector and insulators which are individually mounted in the trough shaped reflector and spaced apart at intervals lengthwise therein and have the helix extending therethrough and supported thereby, the said reflector being an assembly of straight trough-shaped sections and elbow sections which are telescopically fastened to one another at their ends to form the winding with the outer ends of the end sections of the assembly at the periphery of the winding and extending toward one another, and a bracket which is interposed between and has the outer ends of the end sections fastened thereto and held thereby in fixed relation to one another.

References Cited in the file of this patent

UNITED STATES PATENTS

| | | |
|---|---|---|
| 1,637,391 | Russell | Aug. 2, 1927 |
| 1,710,511 | Petrie | Apr. 23, 1929 |
| 1,835,602 | Kercher et al. | Dec. 8, 1931 |
| 2,019,780 | Gough | Nov. 5, 1935 |
| 2,025,898 | Rhodes | Dec. 31, 1935 |
| 2,035,306 | Fannin | Mar. 24, 1936 |
| 2,467,479 | Huck | Apr. 19, 1949 |
| 2,486,791 | Mann et al. | Nov. 1, 1949 |
| 2,722,591 | Fry | Nov. 1, 1955 |
| 2,752,475 | Norris | June 26, 1956 |